Feb. 2, 1960
R. E. BLETCHER ET AL
2,923,315
REMOVABLE VALVE
Filed Nov. 7, 1955
3 Sheets-Sheet 3
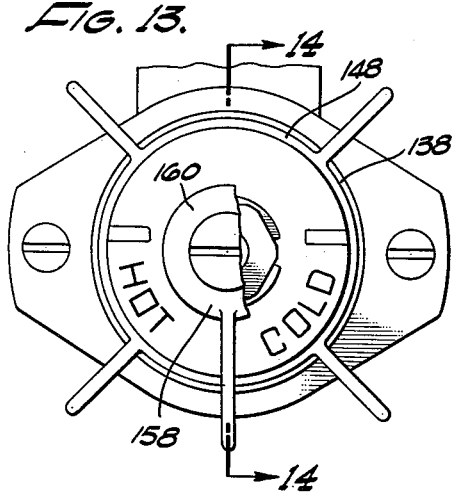
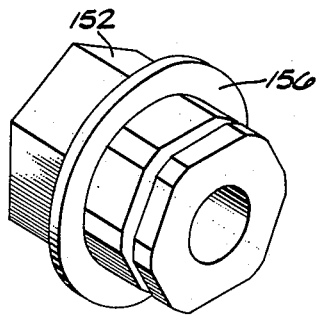
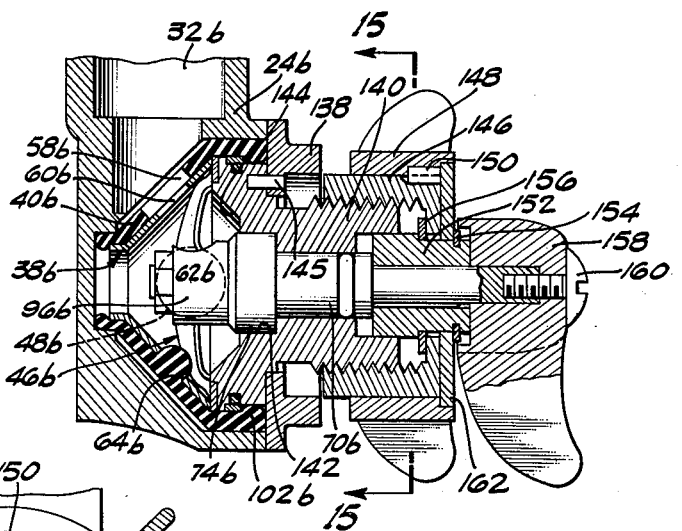
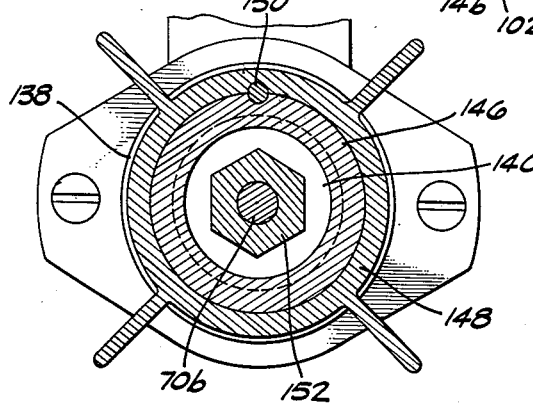
INVENTORS
RALPH E. BLETCHER
IRVING A. WARD
BY ERNEST H. BUCKNELL
ATTORNEYS

United States Patent Office 2,923,315
Patented Feb. 2, 1960

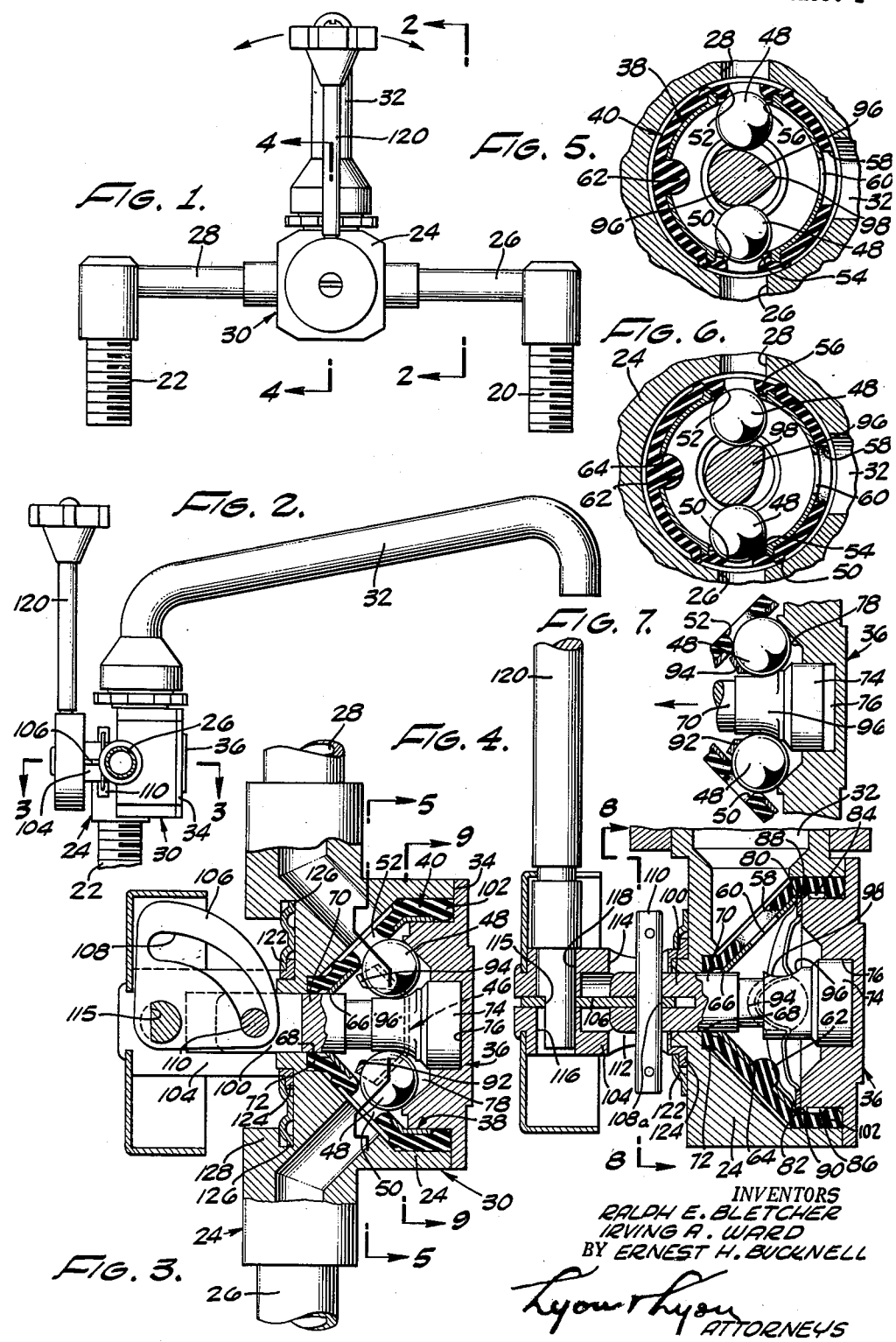

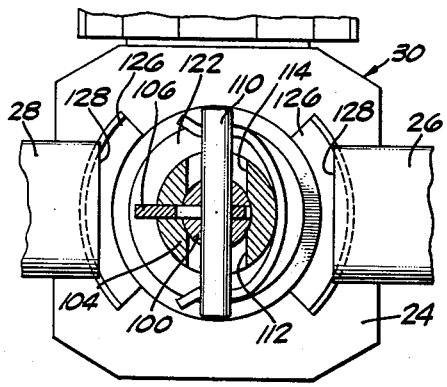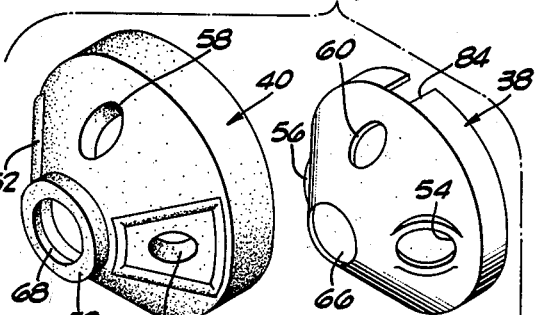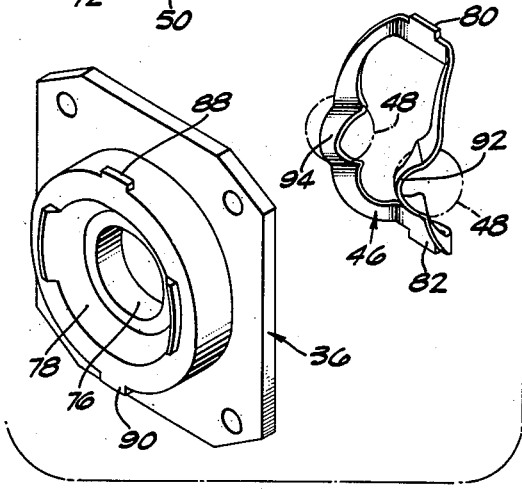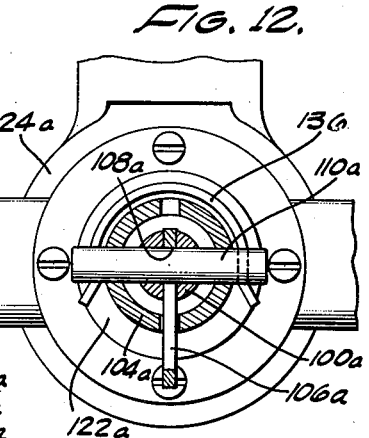

2,923,315

REMOVABLE VALVE

Ralph E. Bletcher, Irving A. Ward, and Ernest H. Bucknell, Los Angeles, Calif., assignors of ten percent to Ralph E. Bletcher, twelve and one-half percent to Ernest H. Bucknell, twelve and one-half percent to Mabel Bucknell, ten percent to Pearl White Bletcher, twenty-five percent to Marcia Bucknell Liston, ten percent to James H. Bletcher, ten percent to Hazel Bletcher Skinner, and ten percent to Charlotte R. B. Robertson; Pearl White Bletcher, James Hamilton Bletcher, and Lawrence E. Irell, executors of said Ralph E. Bletcher, deceased Application November 7, 1955, Serial No. 545,220

15 Claims. (Cl. 137—454.6)

This invention relates to a removable valve.

It is an object of this invention to incorporate the valve elements and valve seats in a removable unit which is readily insertable into or removable from a casting or body of a fixture having appropriate inlets and outlets.

It is a further object of this invention to remove the valve seats from the fixture body so that same need never be in need of repair or replacement.

It is still a further object of this invention to provide a valve wherein all parts subject to wear including the valve seat, support cage, ball valves, spring race, and valve stem, are readily removable from the fixture body to permit repair or replacement.

It is still a further object of this invention to incorporate the valve seats and packing members into a single unit to permit easy and inexpensive replacement of such parts.

It is still a further object of this invention to provide a removable valve wherein chatter or noise usually accompanying the use of a ball valve is eliminated.

It is still a further object of this invention to provide means for permitting flushing of dirt and foreign matter from the valve.

Other objects and advantages will be readily apparent from the following description:

In the drawing:

Figure 1 is an elevation view of a valve embodying this invention.

Figure 2 is a view taken along line 2—2 of Figure 1.

Figure 3 is a view taken along line 3—3 of Figure 2.

Figure 4 is a section taken along line 4—4 of Figure 1.

Figure 5 is a view taken along line 5—5 of Figure 3.

Figure 6 is a view similar to Figure 5 illustrating rotation of the mixture control cam.

Figure 7 is a fragmentary section of the ball valves and mixture control cam.

Figure 8 is a section taken along line 8—8 of Figure 4.

Figure 9 is a section taken along line 9—9 of Figure 3.

Figure 10 is a perspective view of the component elements of the removable unit.

Figure 11 is a fragmentary view in section similar to Figure 3 of a modified form of this invention.

Figure 12 is a section taken along line 12—12 of Figure 11.

Figure 13 is an end view of a further modification.

Figure 14 is a section taken along line 14—14 of Figure 13.

Figure 15 is a section taken along line 15—15 of Figure 14.

Figure 16 is a perspective view of the plug.

The embodiment illustrated in Figures 1 through 10 will be described in detail first. Hot and cold water enters through lines 20 and 22 which terminate in the threaded extremities of the casting or body 24 of the fixture. The outer shell of the body or casting has been eliminated exposing the water passages 26 and 28, leading to the mixing chamber 30 wherein hot and cold water are mixed and discharged through spout 32, which is mounted upon the body casting in a manner well known to those skilled in the art.

This invention is directed to the removable valve unit which permits the body including passages 26 and 28, mixing chamber 30 and the threaded nipple for receiving the spout to be a single casting, as well as an outer shell if desired, free from any valve seats or moving parts.

Referring now more specifically to Figure 3, the mixing chamber 30 is communicated with water passages 26 and 28 and spout 32 and comprises a chamber open at one extremity as at 34 permitting the removable valve unit to be inserted therein and retained by a cap 36, which is held by screws to the walls of the mixing chamber.

In Figure 10 the components of the removable unit are illustrated. The cap 36 is formed of metal as is the support cage 38, while the valve seat and packing member 40 is formed of rubber or suitable resilient material. The remaining portions of the removable unit are the ball positioning spring race 46 and steel balls 48. In assembling the removable unit the resilient valve seat and packing member 40 is positioned on support cage 38, so that the inlet ports 50 and 52 align with the corresponding ports 54 and 56 in the support cage 38. An outlet port 58 of the valve seat and packing member 40 aligns with outlet port 60 of support cage 38 which ports communicate with spout 32 (see Figure 4). Also the valve seat and packing member 40 has a protuberance 62 on its inner surface which enters an aperture 64 in cage 38 to properly index the seating and packing member on the cage.

The cage 38 and seating and packing member 40 each has a centrally located aperture 66 and 68 to receive the valve stem 70. The valve seat and packing member 40 has an enlarged head 72 surrounding aperture 68 forming a packing preventing leakage around the valve stem. The valve stem terminates in an enlarged cylindrical head 74, which fits into recess 76 formed centrally in the cap 36. A ball 48 is provided for each inlet port 50 and 52 being held between the cage and the enlarged head 74. Thus when the head 74 is urged towards the cage 38 the balls seat in ports 50 and 52 shutting off the flow from inlet pipes 26 and 28.

It is to be noted that the ports 50 and 52 of the resilient member 40 are slightly smaller than ports 54 and 56 in cage 38. Also circular flanges are formed on the resilient member which project through ports 54 and 56 so that the balls 48 actually engage the resilient valve seats formed by ports 50 and 52 upon closing.

The cap 36 has an inclined face 78 surrounding recess 76 against which the balls are urged by spring race 46. The spring race has a pair of ears 80 and 82 which enter slots 84 and 86 which receive ears 80 and 82 as well as ears 88 and 90 on cap 36, holding the valve in properly assembled relationship.

The spring race has a pair of bows 92 and 94 formed centrally therein which receive and conform to a portion of the surface of the balls 48. The bows are positioned between the balls and the cage 38 urging same into contact with inclined surface 78. Thus when head 74 is pulled toward cage 38 the balls move towards ports or valve seats 50 and 52 against the urging of spring race 46. This insures proper positioning of the balls as well as eliminates chatter and permits passage of sand and foreign matter through the valve by the yielding of the spring race 46. To further facilitate the proper functioning of the ball valves thus formed it is desirable that the bows 92 and 94 be inclined slightly with respect to inclined face 78, the two converging as they approach the valve seats or ports 50 and 52.

The cap 36 as previously described is held on the body casting by suitable screws when the valve has been thus assembled.

To vary the volume of water admitted through the ball valves the head 74 is moved longitudinally in the cage 38 thereby varying the position of balls 48 with respect to the valve seats. To provide means for varying the mixture of hot and cold water the valve stem 70 is provided with a cam 96 which engages the balls 48 when valve head 74 has been moved opening the valve. When valve stem 70 is rotated the cam will urge one of the balls 48 closer to its valve seat than the other thereby varying the mixture admitted through passages 26 and 28. The cam is for formed that at its high point 98 a ball 48 in contact therewith is seated against its valve seat (see Figure 4), thus permitting entirely hot or entirely cold water to be dispensed. At the other extreme the cam is so formed that the balls 48 are equally spaced from their respective valve seats (see Figure 3).

Thus rotation of valve 70 varies the mixture of water discharged and longitudinal movement thereof varies the volume of water discharged through spout 32.

To provide control for the valve stem 70 same is provided with a bifurcated extremity 100 which projects through the body 24. As previously described the resilient valve seat and packing member 40 has a head 72 formed on one extremity forming a packing preventing leakage around valve stem 70. Also a similar head 102 is formed at the other extremity bearing against cap 36 and preventing leakage around the cap.

The bifurcated extremity 100 of valve stem 70 fits into a control sleeve 104. The sleeve 104 is split to receive lift cam plate 106 having a cam surface 108. A pin 110 fits through the cam groove or surface 108 and through suitable holes in the bifurcated extremity of stem 70. The sleeve 104 is provided with enlarged holes 112 and 114 to permit movement of pin 110 and hence valve stem 70 therein as the cam plate 106 is rotated. The cam plate is provided with a non-circular hole 115 which aligns with holes 116 and 118 in sleeve 104. An actuating handle 120 projects through the aligned holes 115, 116 and 118, thus drivingly engaging the cam plate 106.

Thus when handle 120 is rotated about its own axis the cam plate 106 is pivoted moving the valve stem 70 longitudinally in the cage 38 varying the volume of water flow to the spout. When the handle 120 is rotated about an axis normal to its longitudinal axis the sleeve 104, cam plate 106 and valve stem 70 are rotated about the longitudinal axis of the valve stem, whereby cam 96 varies the position of balls 48 varying the mixture of water discharged to spout 32.

The sleeve 104 is secured to the body 24 by a bayonet locking member 122 which overlies flange 124 on the extremity of the sleeve and in turn has projections 126 underlying a suitable flange 128 on the body.

In Figures 11 and 12 a modified form of this invention is illustrated wherein like parts are given the same numerical designation with the addition of the exponent a. It is readily apparent that the difference between this and the previous embodiment lies in the means for rotating and reciprocating valve stem 70a. The sleeve 104a in this embodiment is slotted at its upper extremity as at 130 to receive handle 120a which is directly fixed to cam plate 106a by pin 132 and both handle and cam plate are pivotally mounted in sleeve 104a on pin 134. Thus pivoting of handle 120a about pin 134 pivots the cam plate 106a which through pin 110a reciprocates valve stem 70a controlling the volume of flow through the valve while the rotation of handle 120a about the longitudinal axis of valve stem 70a rotates the valve stem and thereby controls the hot and cold mixture discharged. A wire 136 passing through suitable holes in pin 110a may be utilized to prevent disassembly. Also the locking member 122a in this embodiment is held by screws in place of a bayonet point.

In Figures 13 through 16 a further modification is illustrated wherein like parts are given the same numerical designation with the addition of the exponent b. It is readily apparent that this embodiment differs from the principal embodiment in the position of the valve stem 70b and in the means for actuating same. Thee valve stem 70b projects beyond head 74b and through cap 138. A plug 140 is also provided which has a recess 142 on its inner end corresponding to recess 76 of cap 36 and an inclined surface 144 similar to inclined surface 78 of cap 36. The cap 138 which is held by screws to the body casting 24b engages the plug 140 and holds same in place. A pin 145 on the cap entering a suitable recess in the plug may be used to prevent relative rotation between the two. The plug 140 is externally threaded to receive an internally threaded sleeve 146 upon which a winged volume control handle 148 is mounted and keyed thereto by pin 150. The sleeve 146 also receives a bushing 152 rotatably mounted therein with washers 154 and 156 maintaining same in place. The washers 154 and 156 loosely engage the sleeve 146 and an outer plate 162 to permit easy relative rotation between the bushing 152 carried by the mixtures control handle 158 and the sleeve 146 and plate 162 carried by the volume control handle 148. The bushing provides a bearing for the extremity of valve shaft 70b which passes therethrough. The extremity of valve shaft 70b conforms to and enters a non-circular bore in the mixture control handle 158 and is secured therein by screw 160. Thus when the mixture control handle 158 is rotated the bushing 152 and valve stem 70b are likewise rotated, rotating cam 96b and varying the relative positions of balls 48b and thus controlling the mixture of hot and cold water.

When the volume control handle 148 is rotated sleeve 146 rotates therewith and moves relative to the cap 138 in accordance with the degree of rotation and the pitch of the screw threads on plug 140 and sleeve 146. When sleeve 146 is moving away from cap 138 the outer plate 162 carried by handle 148, acts on the washer 154 on the mixture control handle thereby axially, but non-rotatably, moving same and hence valve stem 70b and head 74b to the right, in Figure 14, increasing the volume admitted. When sleeve 146 moves toward cap 138, the internal flange on sleeve 146 acts through the washer 156 to axially, but non-rotatably, move the bushing 152 toward the left. Bushing 152 acts on the shoulder on valve stem 70b, which axially, but non-rotatably, moves the head 74b to the left, in Figure 14, reducing the volume of water admitted without changing the ratio of hot and cold water.

While what hereinbefore has been described is the preferred embodiment of this invention, it is readily apparent that alterations and modifications can be resorted to without departing from the scope of this invention and such alterations and modifications are intended to be included within the scope of the appended claims.

We claim:

1. A valve having a removable valve unit comprising: a body having a pair of inlets and an outlet, and having a mixing chamber open at one extremity and communicating with said inlets, a single valve seat forming means mounted in said mixing chamber and axially insertable through said open extremity of said chamber in said body forming a valve seat for each inlet between said inlets and said outlet, removable valve means for each valve seat, means removable from said body for simultaneously opening and closing the valves thus formed to control the volume of flow through said unit, said last mentioned means including means for varying the opening of said valve means with respect to each other without varying the volume of flow through said unit.

2. A valve having a removable valve unit comprising: a valve body having a pair of inlets and an outlet, a resilient element insertable into said valve body having a valve seat for each inlet and a port communicating with said outlet, removable valve means for each valve seat, means removable from said body for simultaneously opening and closing the valves thus formed to control the volume of flow through said unit, said last mentioned means including means for varying the opening of said valve means with respect to each other without varying the volume of flow through said unit.

3. A valve having a removable valve unit comprising: a valve body having a pair of inlets and an outlet, a resilient element insertable into said valve body having a valve seat for each inlet and a port communicating with said outlet, a support cage insertable into said body engaging said resilient element and having ports communicating with the valve seats and port in said resilient element, removable valve means for each valve seat, means removable from said body for simultaneously opening and closing the valves thus formed, to control the volume of flow through said unit, said last mentioned means including means for varying the opening of said valve means with respect to each other without varying the volume of flow through said unit.

4. A valve having a removable valve unit comprising: a valve body having a pair of inlets and an outlet, a resilient element insertable into said valve body having a valve seat for each inlet and a port communicating with said outlet, a support cage insertable into said body engaging said resilient element and having ports communicating with the valve seats and port in said resilient element, a pair of balls in said cage one for each valve seat forming therewith a valve for controlling flow through each inlet, means for moving said balls simultaneously towards and away from said valve seats to control the volume of flow from said inlets and means for moving said balls simultaneously in opposite directions in relation to said valve seats to vary the flow through each inlet without varying the volume of flow through said outlet.

5. A removable valve unit for a fixture having a hot and a cold water inlet and a common outlet in a valve body member comprising: a resilient element having a pair of valve seats and a port, a support cage engaging said resilient element and having ports communicating with the valve seats and port in said resilient element, a pair of balls in said cage one for each valve seat forming therewith a valve for controlling flow through each valve seat, a valve stem having a head thereon for engaging said balls and urging same towards said valve seats against the pressure of flow therethrough upon longitudinal movement of said valve stem, a cam formed upon said valve stem for simultaneously varying the positions of said balls with respect to said valve seats upon rotation of said valve stem.

6. A removable valve unit for a fixture having a hot and a cold water inlet and a common outlet in a valve body member comprising: a resilient element having a pair of valve seats and a port, a support cage engaging said resilient element and having ports communicating with the valve seats and port in said resilient element, a pair of balls in said cage one for each valve seat forming therewith a valve for controlling flow through each valve seat, a valve stem having a head thereon for engaging said balls and urging same towards said valve seats against the pressure of flow therethrough upon longitudinal movement of said valve stem, a cam formed upon said valve stem for simultaneously varying the positions of said balls with respect to said valve seats upon rotation of said valve stem and means forming an inclined surface for guiding movement of said balls.

7. A removable valve unit for a fixture having a hot and a cold water inlet and a common outlet in a valve body member comprising: a resilient element having a pair of valve seats and a port, a support cage engaging said resilient element and having ports communicating with the valve seats and port in said resilient element, a pair of balls in said cage one for each valve seat forming therewith a valve for controlling flow through each valve seat, a valve stem having a head thereon for engaging said balls and urging same towards said valve seats against the pressure of flow therethrough upon longitudinal movement of said valve stem, a cam formed upon said valve stem for simultaneously varying the positions of said balls with respect to said valve seats upon rotation of said valve stem, means forming an inclined surface for guiding movement of said balls and a spring race engaging said balls and urging same into contact with said head.

8. A removable valve unit for a fixture having a hot and a cold water inlet and a common outlet in a valve body member comprising: a resilient element having a pair of valve seats and a port, a support cage engaging said resilient element and having ports communicating with the valve seats and port in said resilient element, a pair of balls in said cage one for each valve seat forming therewith a valve for controlling flow through each valve seat, a valve stem having a head thereon for engaging said balls and urging same towards said valve seats against the pressure of flow therethrough upon longitudinal movement of said valve stem, a cam formed upon said valve stem for simultaneously varying the positions of said balls with respect to said valve seats upon rotation of said valve stem, means forming an inclined surface for guiding movement of said balls, a spring race engaging said balls and urging same into contact with said head and said race having the ball engaging surfaces thereof inclined with respect to said inclined surface converging as approaching said valve seats.

9. A removable valve unit for a fixture having a hot and a cold water inlet and a common outlet in a valve body member, said valve unit comprising: a member having a pair of resilient valve seats and a port, a cage, a pair of balls in said cage one for each valve seat forming therewith a valve for controlling flow through each valve seat, a valve stem mounted for longitudinal and rotary movement and having a head thereon including a tapered surface for engaging said balls and urging same towards said valve seats against the pressure of flow therethrough upon longitudinal movement of said valve stem and a cam formed upon said valve stem for simultaneously varying the positions of said balls with respect to said valve seats and relative to each other upon rotation of said valve stem.

10. A removable valve unit for a fixture having a hot and a cold water inlet and a common outlet in a valve body member, said valve unit comprising: a member having a pair of resilient valve seats and a port, a cage, a pair of balls in said cage one for each valve seat forming therewith a valve for controlling flow through each valve seat, a valve stem mounted for longitudinal and rotary movement and having a head thereon including a tapered surface for engaging said balls and urging same towards said valve seats against the pressure of flow therethrough upon longitudinal movement of said valve stem, a cam formed upon said valve stem for simultaneously varying the positions of said balls with respect to said valve seats and relative to each other upon rotation of said valve stem and cooperating means forming an inclined surface for guiding movement of said balls.

11. A removable valve unit for a fixture having a hot and a cold water inlet and a common outlet in a valve body member, said valve unit comprising: a member having a pair of resilient valve seats and a port, a cage, a pair of balls in said cage one for each valve seat forming therewith a valve for controlling flow through each valve seat, a valve stem mounted for longitudinal and rotary movement and having a head thereon including a tapered surface for engaging said balls and urging same towards said valve seats against the pressure of flow therethrough upon longitudinal movement of said valve stem, a cam formed upon said valve stem for simultaneously varying the positions of said balls with respect to said valve seats and relative to each other upon rotation of said valve stem, cooperating means forming an inclined surface for guiding movement of said balls and a spring race engaging said balls and urging same into contact with said head.

12. A removable valve unit for a fixture having a hot and a cold water inlet and a common outlet in a valve body member, said valve unit comprising: a member having a pair of resilient valve seats and a port, a cage, a pair of balls in said cage one for each valve seat forming therewith a valve for controlling flow through each valve seat, a valve stem mounted for longitudinal and rotary movement and having a head thereon including a tapered surface for engaging said balls and urging same towards said valve seats against the pressure of flow therethrough upon longitudinal movement of said valve stem, a cam formed upon said valve stem for simultaneously varying the positions of said balls with respect to said valve seats and relative to each other upon rotation of said valve stem, cooperating means forming an inclined surface for guiding movement of said balls, a spring race engaging said balls and urging same into contact with said head and said race having the ball engaging surfaces thereof inclined with respect to said inclined surface converging as approaching said valve seats.

13. In combination, a fixture including a body member having a hot and a cold water inlet and a common outlet and having a recess therein forming a mixing chamber communicating with said inlets and outlet; a removable valve unit, comprising: a resilient element in said recess having valve seats communicating with each inlet and a port communicating with said outlet, a support cage in said recess engaging said resilient element and having ports communicating with the valve seats and port in said resilient element, a pair of balls in said cage one for each valve seat forming therewith a valve for controlling flow through each valve seat, a valve stem mounted for longitudinal and rotary movement and having a head thereon including a tapered surface for engaging said balls and urging same towards said valve seats against the pressure of flow therethrough upon longitudinal movement of said valve stem, a cam formed upon said valve stem for simultaneously varying the positions of said balls with respect to said valve seats and relative to each other upon rotation of said valve stem, cooperating means forming an inclined surface for guiding movement of said balls, a spring race engaging said balls and urging same into contact with said head, said race having the ball engaging surfaces thereof inclined with respect to said inclined surface converging as approaching said valve seats; and means for engaging said valve stem outside of said body member for moving same longitudinally and means for engaging said valve stem outside said body member for rotating said valve stem.

14. In combination, a fixture including a body member having a hot and a cold water inlet and a common outlet and having a recess therein forming a mixing chamber communicating with said inlets and outlet; a removable valve unit, comprising: a resilient element in said recess having valve seats communicating with each inlet and a port communicating with said outlet, a support cage in said recess engaging said resilient element and having ports communicating with the valve seats and port in said resilient element, a pair of balls in said cage one for each valve seat forming therewith, a valve for controlling flow through each valve seat, a valve stem mounted for longitudinal and rotary movement and having a head thereon including a tapered surface for engaging said balls and urging same towards said valve seats against the pressure of flow therethrough upon longitudinal movement of said valve stem, a cam formed upon said valve stem for simultaneously varying the positions of said balls with respect to said valve seats and relative to each other upon rotation of said valve stem, cooperating means forming an inclined surface for guiding movement of said balls, a spring race engaging said balls and urging same into contact with said head, said race having the ball engaging surfaces thereof inclined with respect to said inclined surface converging as approaching said valve seats; and means for engaging said valve stem outside of said body member for moving same longitudinally, said means including means for rotating said valve stem.

15. In combination, a fixture including a body member having a hot and a cold water inlet and a common outlet and having a recess therein forming a mixing chamber communicating with said inlets and outlet; a removable valve unit, comprising: a resilient element in said recess having valve seats communicating with each inlet and a port communicating with said outlet, a support cage in said recess engaging said resilient element and having ports communicating with the valve seats and port in said resilient element, a pair of balls in said cage one for each valve seat forming therewith a valve for controlling flow through each valve seat, a valve stem mounted for longitudinal and rotary movement and having a head thereon including a tapered surface for engaging said balls and urging same towards said valve seats against the pressure of flow therethrough upon longitudinal movement of said valve stem, a cam formed upon said valve stem for simultaneously varying the positions of said balls with respect to said valve seats and relative to each other upon rotation of said valve stem, cooperating means forming an inclined surface for guiding movement of said balls, a spring race engaging said balls and urging same into contact with said head, said race having the ball engaging surfaces thereof inclined with respect to said inclined surface converging as approaching said valve seats, said valve stem projecting from said body member and having a bifurcated extremity; and a cam plate retained in said bifurcated extremity, means for pivoting said cam plate to move said valve stem longitudinally and means for rotating said cam plate and said valve stem.

References Cited in the file of this patent

UNITED STATES PATENTS

| | | |
|---|---|---|
| 1,082,329 | Hodgdon | Dec. 23, 1913 |
| 1,092,421 | Anderson | Apr. 7, 1914 |
| 1,093,117 | Deiller | Apr. 14, 1914 |
| 1,690,767 | Block | Nov. 6, 1928 |
| 2,238,916 | Powers | Apr. 22, 1941 |
| 2,301,439 | Moen | Nov. 10, 1942 |
| 2,405,940 | Burkhardt | Aug. 20, 1946 |
| 2,494,633 | Schlicksupp | Jan. 17, 1950 |
| 2,575,940 | Brown | Nov. 20, 1951 |
| 2,679,865 | Griffith | June 1, 1954 |
| 2,756,773 | Bauerlein | July 31, 1956 |

Disclaimer 2,923,315.—*Ralph E. Bletcher, Irving A. Ward,* and *Ernest H. Bucknell,* Los Angeles, Calif. REMOVABLE VALVE. Patent dated Feb. 2, 1960. Disclaimer filed Feb. 23, 1976, by the assignee, *Pearl White Bletcher,* part interest.

Hereby enters this disclaimer to her entire interest in all claims of said patent.

[*Official Gazette June 1, 1976.*]